United States Patent
Kobyakov et al.

(10) Patent No.: US 9,098,598 B1
(45) Date of Patent: Aug. 4, 2015

(54) NON-DEFAULT LOCATION SUPPORT FOR EXPANDABLE CONTENT ITEM PUBLISHER SIDE FILES

(75) Inventors: Pavel Kobyakov, Waterloo (CA); Ksenia Shubina, Vaughan (CA)

(73) Assignee: Google Inc., Mountain View, CA (US)

( * ) Notice: Subject to any disclaimer, the term of this patent is extended or adjusted under 35 U.S.C. 154(b) by 66 days.

(21) Appl. No.: 13/464,652

(22) Filed: May 4, 2012

(51) Int. Cl.
*G06F 17/30* (2006.01)

(52) U.S. Cl.
CPC ............... *G06F 17/30905* (2013.01)

(58) Field of Classification Search
CPC ............................................. G06F 17/30905
USPC ................................................. 707/729, 754
See application file for complete search history.

(56) References Cited

U.S. PATENT DOCUMENTS

| | | | |
|---|---|---|---|
| 6,115,690 A | 9/2000 | Wong | |
| 6,615,251 B1 | 9/2003 | Klug | |
| 6,662,230 B1 | 12/2003 | Eichstaedt et al. | |
| 6,725,287 B1 | 4/2004 | Loeb et al. | |
| 6,973,436 B1 | 12/2005 | Shkedi | |
| 7,028,071 B1 | 4/2006 | Slik | |
| 7,124,129 B2 | 10/2006 | Bowman et al. | |
| 7,610,560 B2 | 10/2009 | Horvitz et al. | |
| 7,746,343 B1 | 6/2010 | Charaniya et al. | |
| 7,853,492 B1 | 12/2010 | Kirklin et al. | |
| 7,941,484 B2 | 5/2011 | Chandler et al. | |
| 7,949,702 B2 | 5/2011 | McGee et al. | |
| 7,979,382 B2 | 7/2011 | Guyan et al. | |
| 8,160,985 B2 | 4/2012 | Hino | |
| 8,237,937 B2 | 8/2012 | Sugiyama | |
| 8,350,849 B1 | 1/2013 | Jones et al. | |
| 8,352,539 B2 | 1/2013 | Mizuno | |
| 8,462,949 B2 | 6/2013 | Anderson et al. | |
| 8,510,167 B2 | 8/2013 | Lisbakken | |
| 8,578,057 B2 | 11/2013 | Omar | |
| 8,606,723 B2 | 12/2013 | Seubert et al. | |
| 8,694,632 B1 | 4/2014 | Shubina et al. | |
| 8,751,304 B1 | 6/2014 | Kobyakov et al. | |
| 2002/0042786 A1 | 4/2002 | Scarborough | |

(Continued)

FOREIGN PATENT DOCUMENTS

WO    WO0019332 A9    4/2000

OTHER PUBLICATIONS

Brajnik, Giorgio, and Silvia Gabrielli. "A review of online advertising effects on the user experience." International Journal of Human-Computer Interaction26.10 (2010): 971-997.*

(Continued)

*Primary Examiner* — Usmaan Saeed
*Assistant Examiner* — Nan Hutton
(74) *Attorney, Agent, or Firm* — Fish & Richardson P.C.

(57) ABSTRACT

This specification describes methods, systems, and apparatus, including computer programs encoded on a computer-readable storage device, for non-default location support for publisher side files. In an aspect, location macros are used in content item data. The location macros are specific to vendors that serve the content items. For each content item request for which a publisher specified by the request utilizes a default location for a publisher side file location, the content item data are modified to specify the default location. Conversely, for each request for which the publisher specified by the request utilizes a non-default location for the publisher side file location, the content item data are modified to specify the non-default location.

21 Claims, 6 Drawing Sheets

(56) References Cited

U.S. PATENT DOCUMENTS

| | | | |
|---|---|---|---|
| 2002/0046199 A1 | 4/2002 | Scarborough | |
| 2002/0152305 A1 | 10/2002 | Jackson | |
| 2002/0169803 A1 | 11/2002 | Sampath et al. | |
| 2003/0137512 A1 | 7/2003 | Hoehn et al. | |
| 2003/0182310 A1 | 9/2003 | Charnock et al. | |
| 2003/0182394 A1 | 9/2003 | Ryngler et al. | |
| 2004/0193388 A1 | 9/2004 | Outhred et al. | |
| 2004/0205711 A1 | 10/2004 | Ishimitsu et al. | |
| 2006/0074730 A1 | 4/2006 | Shukla et al. | |
| 2007/0150387 A1 | 6/2007 | Seubert et al. | |
| 2007/0299857 A1 | 12/2007 | Gwozdz et al. | |
| 2008/0288342 A1 | 11/2008 | Ingleshwar | |
| 2009/0040246 A1 | 2/2009 | Miyasaka | |
| 2009/0099901 A1 | 4/2009 | Sah et al. | |
| 2009/0187583 A1 | 7/2009 | Pape et al. | |
| 2009/0299862 A1 | 12/2009 | Fan et al. | |
| 2010/0082657 A1 | 4/2010 | Paparizos et al. | |
| 2010/0306249 A1 | 12/2010 | Hill et al. | |
| 2010/0313129 A1 | 12/2010 | Hyman | |
| 2011/0055685 A1 | 3/2011 | Jaquish et al. | |
| 2011/0071818 A1 | 3/2011 | Jiang | |
| 2011/0153435 A1 | 6/2011 | Pisaris-Henderson | |
| 2011/0161990 A1 | 6/2011 | Smith et al. | |
| 2012/0101907 A1* | 4/2012 | Dodda | 705/14.73 |
| 2013/0006730 A1* | 1/2013 | Secretan et al. | 705/14.4 |
| 2013/0238994 A1 | 9/2013 | Yurasits | |
| 2013/0275901 A1 | 10/2013 | Saas et al. | |
| 2013/0339896 A1 | 12/2013 | Shadle et al. | |
| 2014/0164923 A1 | 6/2014 | Georgiev et al. | |
| 2014/0164985 A1 | 6/2014 | Pimmel et al. | |
| 2014/0240293 A1 | 8/2014 | McCaughan et al. | |

OTHER PUBLICATIONS

Sigel, Adam, Gerald Braun, and Mark Sena. "The impact of banner ad styles on interaction and click-through rates." Issues in Information Systems 9.2 (2008): 337-342.*

McMillan, Sally J. "Internet advertising: One face or many." Manuscript prepared for Internet Advertising: Theory and Research (2004).*

How do iframe busters for expandable ads work?; javascript—How do iframe busters for expandable ads work?—Stack Overflow; http://stackoverflow.com/questions/5553469/how-do-iframe-busters-for-expandable-ads-work; Aug. 15, 2012; 3 pages.

Introducing expandable ads on AdSense sites—Inside AdSense; Inside AdSense Blog; http://adsense.blogspot.com/2009/03/introducing-expandable-ads-on-adsense.html; Aug. 14, 2012; Mar. 4, 2009; 8 pages.

Macro overview; dfp DoubleClick for Publishers; http://support.google.com/dfp_premium/bin/answer.py?hl=en&answer=1242718; Aug. 14, 2012; 7 pages.

Expanding Options in Expandable Ads; Jun. 4, 2009; Wegert, Tessa; ClickZ/Marketing News & Expert Advise; http://www.clickz.com/clickz/column/1699404/expanding-options-expandable-ads; Aug. 15, 2012; 3 pages.

Gilbert, David, "Set IFRAME height based on size of remotely loaded content", solidgone Blog, Mar. 13, 2010, XP055066250, Retrieved from the Internet: URL:http://solidgone.org/Set-IFRAME-height-based-on-size-of-remotely-loaded-content [retrieved on Jun. 11, 2013], abstract, 10 pages.

"Peters, 'Iframe loading techniques and performance', aaronpeters. nl, Dec. 20, 2010, on line at aaronpeters.nl/blog/iframeloading-techniques-performance?%3E", 11 pages.

* cited by examiner

NON-DEFAULT LOCATION SUPPORT FOR EXPANDABLE CONTENT ITEM PUBLISHER SIDE FILES

BACKGROUND

This specification relates to information presentation.

Sponsored content (e.g. advertisements, deals or special offers) can be provided over the Internet to various user devices. For example, a web page can include slots in which sponsored content can be presented. These slots can be defined in the web page or defined for presentation with a web page, for example, along with search results or other content. Sponsored content can also be delivered through dedicated web portals or applications executing on the user devices.

Some content items are expandable. For example, a content item can be initially presented in an unexpanded form as a 728×90 pixel graphical item. When a user selects or interacts with this content item, an expanded view of 728×270 pixels can be presented. To facilitate the processing of expandable content items in particular types of content item slots, such as iFrames, a content item provider (such as, in the case of advertisements, an advertiser or a vendor that handles the placement of advertisements for advertisers) provides a "publisher side file" (PSF) for a publisher host. The PSF file stores instructions that are used to ensure proper rendering, expansion and contraction of the expandable content item. Often the content item provider specifies location on the publisher host for storing the file so that a user device can request the publisher side file from the host. For example, a specified location for a particular vendor Vendor1 may specify a directory entitled "Vendor1Path" at the root of a publisher webserver. Thus, the PSF file V1PSF.html for Vendor1 for a host www.example1.com may be retrieved by the URL:

http://www.example1.com/Vendor1Path/V1PSF.html.

SUMMARY

In general, one aspect of the subject matter described in this specification can be embodied in methods that include the actions of receiving an expandable content item requests for publishers, each request specifying a publisher, and for each request: receiving data specifying an expandable content item selected to fulfill the request, the data including a location macro, and determining whether the publisher specified by the request utilizes a default location for a publisher side file location or a non-default location for the publisher side file location, wherein the publisher side file location specifies a location of a publisher side file that facilitates processing of an expandable content item in a resource served by the publisher, the default location is a location specified by a vendor of the expandable content item and the non-default location is a location that is different from the default location and specified by the publisher; for each request for which the publisher specified by the request utilizes a default location for the publisher side file location, modifying the data specifying the expandable content item to specify the default location; and for each request for which the publisher specified by the request utilizes a non-default location for the publisher side file location, modifying the data specifying the expandable content item to specify the non-default location. Other embodiments of this aspect include corresponding systems, apparatus, and computer program products.

Another aspect of the subject matter described in this specification can be embodied in methods that include the actions of receiving expandable content item requests for publishers, each request specifying a publisher, and for each request: identifying expandable content items eligible to fulfill the content item request, and determining whether the publisher specified by the request utilizes a default location for a publisher side file location or a non-default location for the publisher side file location, wherein the publisher side file location specifies a location of a publisher side file that facilitates processing of an expandable content item in a resource served by the publisher, the default location is a location specified by a vendor of the expandable content item, and the non-default location is a location that is different from the default location and specified by the publisher, and for each request for which the publisher specified by the request utilizes a default location for the publisher side file location, allowing each of the candidate expandable content items to participate in a content item selection process to select one of the candidate expandable content items to fulfill the request. Other embodiments of this aspect include corresponding systems, apparatus, and computer program products.

Particular embodiments of the subject matter described in this specification can be implemented so as to realize one or more of the following advantages. The non-default location support allows publishers to simplify site maintenance by allowing publishers to place publisher side files in a single location, or locations of their choosing. This is advantageous for publisher that receive expandable content items, such as expandable advertisements, through advertising exchanges, as the expandable advertisements are often provided by many different vendors and advertisers. Furthermore, when an advertiser uses a publisher location macro in an advertisement, the same tag can be used for all publishers, regardless of whether each particular publisher is using the "default" vendor specified location or a "non-default" publisher specified location specific to the publisher.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

The subject matter of this application provides for a publisher capability to configure publisher side file locations for multiple different vendors. A content item management system, such as, in the case of advertisements, an advertising exchange, stores location data specifying, for each of multiple publishers, whether the publisher stores publisher side files for vendors in default locations specified by the vendors, or in a non-default location specified by the publisher. In the case of advertisements served over an exchange, a content sponsor is typically an advertiser that uses a vendor that places advertisements for advertisers through an exchange. The vendor provides technology for creating and serving the advertisements.

When a particular content item is selected to be served in response to a request for an expandable content item for a resource served by a publisher, and when content item tag for the content item includes a location macro, the content item management system determines whether the publisher specified by the request utilizes a default location for the publisher side file location. If the content item management system determines the publisher utilizes a default location, then the system modifies content item data to specify the default location specified by the vendor of the content item. Conversely, if the content item management system determines the publisher utilizes a non-default location specified by the publisher, then the system modifies content item data to specify the non-default location.

Some content item data, however, may not include location macros. For example, some vendors or advertisers may not include location macros, and may instead only include a default location. Thus, in the case of a publisher that uses non-default locations to store publisher side files, the content items for which location macros are not included may not render properly, as the user device will not have correct location information for the publisher side file. Accordingly, in some implementations, the content item management system includes a selection filter. The selection filter is used to filter out content items for which location macros are not included from a content item selection process for a publisher that uses a non-default location to store publisher side files. The selection filter ensures that any resulting selected content item can be processed to include the non-default location specified by the publisher. The selection filter, however, does not filter out any content items from a content item selection process corresponding to a publisher that uses default locations to store publisher side files. In the latter case, the content item will either include the non-default location or the content item management system will be able to modify the content item data to specify the default location.

These features and other features are described in more detail below.

Example Environment

Figure 1:
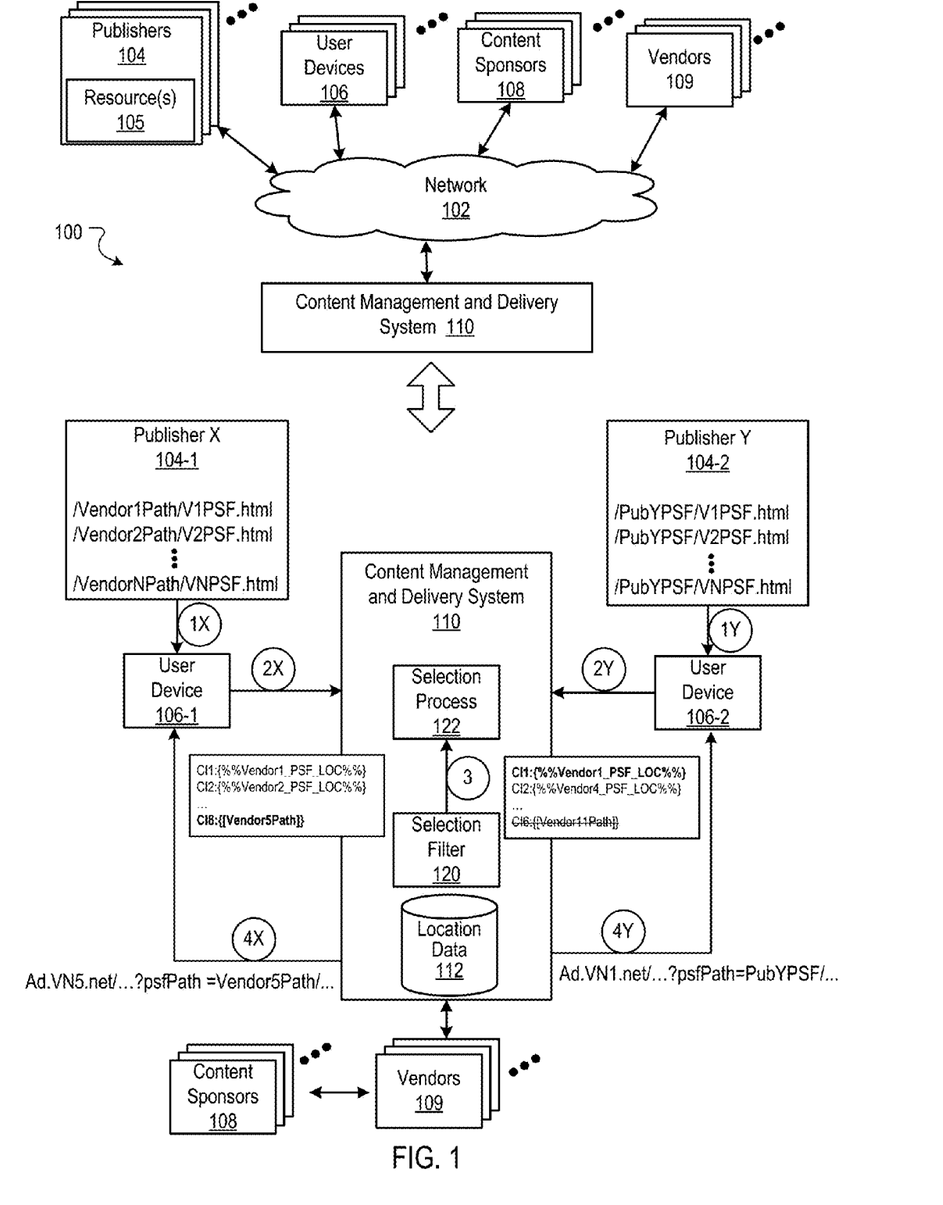
FIG. 1 is a block diagram of an example environment for delivering content.

FIG. 1 is a block diagram of an example environment 100 for delivering content. The example environment 100 includes a content management and delivery system 110 for selecting and providing content to user devices. The example environment 100 includes a network 102, such as wide area network (WAN), the Internet, or a combination thereof. The network 102 connects publisher 104, user devices 106, content sponsors 108 (e.g., advertisers that use vendors to serve advertisements), vendors 109, and the content management and delivery system 110. The example environment 100 may include many thousands of publishers 104, user devices 106, content sponsors 108.

In some implementations, the content management and delivery system 110 includes a request handler that can receive a request for content from a user device, identify one or more eligible content items, and provide a content item responsive to the request.

A publisher 104 typically manages a website that includes one or more resources 105 associated with a domain name and hosted by one or more servers. An example website is a collection of web pages formatted in hypertext markup language (HTML) that can contain text, images, multimedia content, and programming elements, such as scripts. Each publisher 104 is an entity that controls, manages and/or owns the website.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts). In some implementations, the resources 105 can include sponsored content provided by the content sponsors 108 and that can be rendered in specific locations in the resource. For example, the resources 105 can include an advertisement, a deal or a special offer sponsored by a content sponsor 108.

A user device 106 is an electronic device that is under control of a user and is capable of requesting and receiving resources over the network 102. Example user devices 106 include personal computers, televisions with one or more processors embedded therein or coupled thereto, set top boxes, mobile communication devices (e.g., smartphones), tablet computers, e-readers, laptop computers, personal digital assistants (PDA), and other devices that can send and receive data over the network 102. A user device 106 typically includes one or more user applications, such as a web browser, to facilitate the sending and receiving of data over the network 102.

A user device 106 can request resources 105 from a publisher 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., content item slots, or, in the case of advertisement content items, advertisement slots).

When a resource 105 is requested by a user device 106 and the resource includes a content item slot in which a content item of a sponsor is to be rendered, the content management system 110 receives a request for a content item. The request for the content item can include characteristics of the slots that are defined for the requested resource.

The content management and delivery system 110 can select from the eligible content items that are to be provided to the user device 106 based at least in part, for example, on results of an auction (or by some other content item selection process). For example, for the eligible content items, the content management and delivery system 110 can receive offers from content sponsors 108 and allocate or prioritize delivery of the content items, based at least in part on the received offers (e.g., based on the highest bidders at the conclusion of the auction or based on other criteria, such as those related to satisfying open reservations).

For situations in which the systems discussed here collect personal information about users, the users may be provided with an opportunity to opt in/out of programs or features that may collect personal information (e.g., information about a user's social network, social actions or activities, profession, a user's preferences, or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. In some implementations, users can opt out of being characterized or targeted for content, including advertisements, based on the interest profiles for which they may be characterized.

Figure 2A:
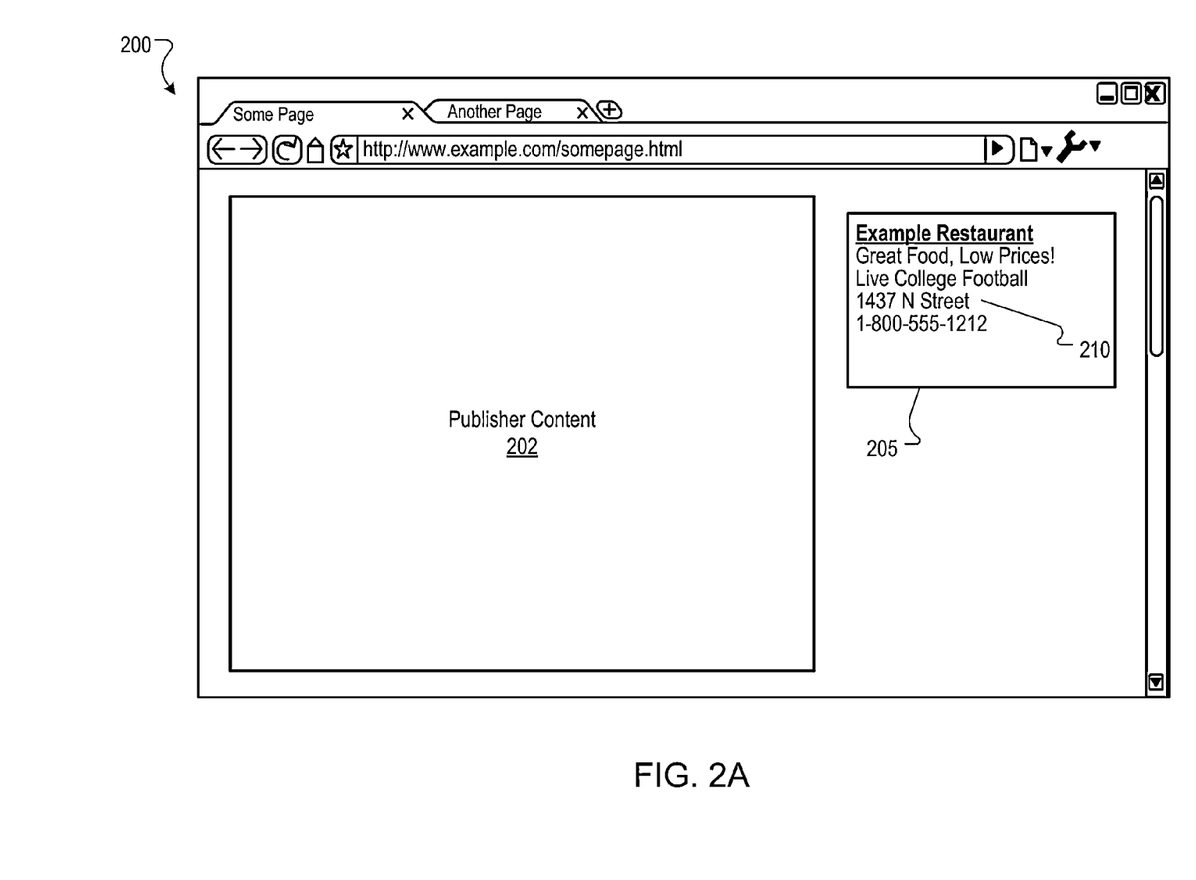
FIG. 2A depicts a browser displaying a sponsored content item.

FIG. 2A shows an example user interface 200 in which content (such as sponsored content or requested content, or both) is provided to a user device 106. For example, the resource can include specific publisher content 202 that is authored by the publisher. Additionally, resource includes a content item slot 205 in which a content item from a third party can be rendered. The content management and delivery system 110 can provide the third-party content item (e.g., advertisements, etc.) from a pool of available content items.

In some implementations, the one or more content items 210 that are selected can be selected by conducting an auction. The content items that are eligible to participate in the auction can be selected by various targeting criteria, such as interest profiles, the relevance of content items to the publisher content 202, to a time of the day, geographical location, keywords, to name a few examples.

Figure 2B:
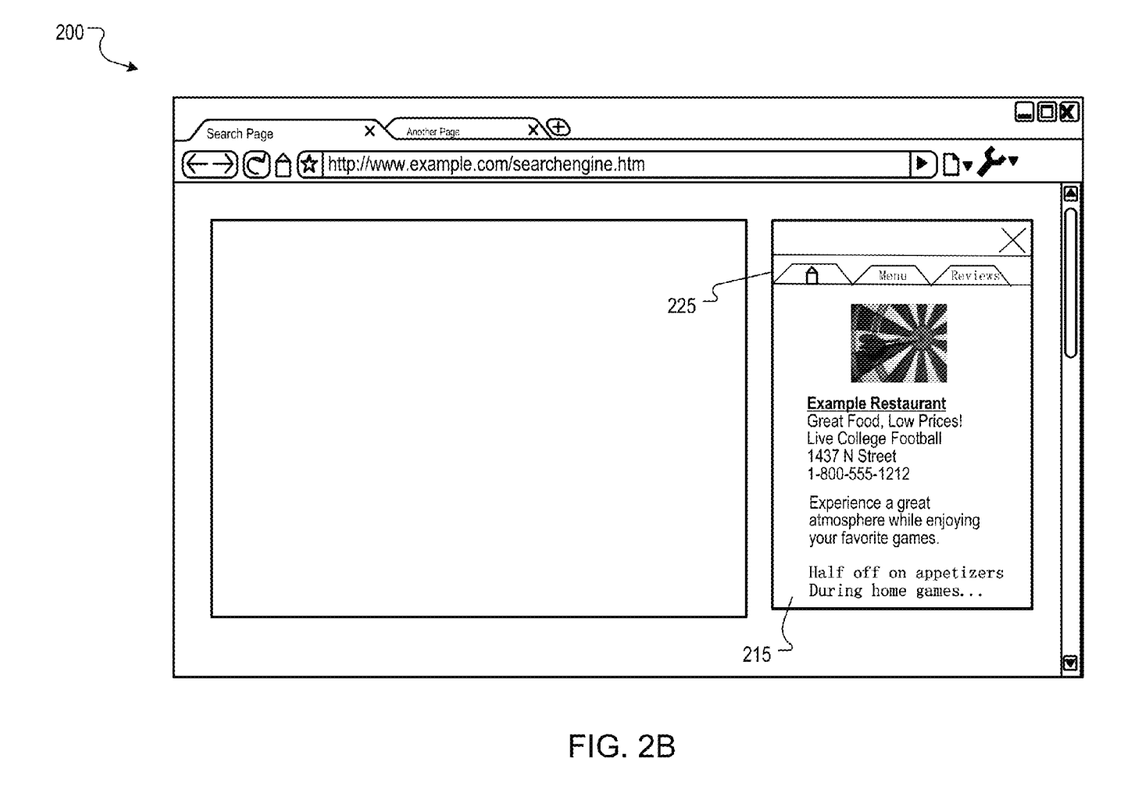
FIG. 2B depicts a browser displaying an expanded version of the sponsored content item.

In the case of expandable content items, an unexpanded version of the content item is initially rendered in the content item slot 205. When a user interacts with the content item 210 or with a trigger mechanism associated with the content item 210, the content item can be rendered in an expanded version. For example an expanded version 215 of the content item 210 is shown in the example of FIG. 2B. The expanded version 215 displays additional information. The expanded version 215 can include additional content, for example, images, larger text, audio, video, or web-based content. In one example, the content item 210 is presented first as an advertisement in textual format while enabling the user to expand the advertisement into a menu-driven, graphical advertisement in the expanded version 215. In some implementations, the action taken by the user to initiate launching the expanded version 215 can include selecting an expansion icon, selecting a marker on the side, below or above the content item, selecting or hovering a pointer over a particular portion of the content item, or, another form of user initiated and controlled action. The expanded content item 215 can also include a marker that the user can click or otherwise select such that the expanded content item 215 is replaced by the unexpanded content item 210.

The expansion and control of the content item 205 and the expanded content item 215 is facilitated, in part, by the publisher side file of the content sponsor 108 of the content item. In the case of advertisements served over an exchange, a content sponsor 108 is typically an advertiser that uses a vendor 109 for placing advertisements for advertisers through an exchange. The vendor 109 provides technology for creating and serving the advertisements.

Non-Default Location Support for Publisher Side Files

As described above, the content management system 110 facilitates a publisher specifying non-default locations for publisher side files for hosts controlled by the publisher. In some implementations, non-default locations are specified for each host of the publisher so that a publisher may have different non-default locations for each host of the publisher. A location macro is used for an expandable content item tag, and the location macro is specific to each vendor 109. The publisher 104 provides to the content item management system 110 data that specifies whether the publisher host is utilizing a non-default location, and, if the publisher host is utilizing a non-default location, a location of the publisher side files on the host.

To illustrate, assume that each content sponsor 108 uses a vendor to serve advertisements. Any particular vendor 109 may serve advertisements for multiple advertisers. Thus, the content items of a vendor 109 may be advertisements from many different advertisers 108.

Assume there are N vendors, e.g., Vendor1, Vendor2 . . . VendorN. Each vendor has a corresponding publisher side file, V1PSF.html, V2PSF.html . . . VNPSF.html for the expandable content items it serves. Furthermore, each vendor specifies a particular default location specific to the vendor, e.g., Vendor1 Path, Vendor2Path . . . . VendorNPath. Thus, for a particular host www.example1.com, the URLs of default locations of the publisher side files for the vendors are:

www.example1.com/Vendor1Path/V1PSF.html
www.example1.com/Vendor2Path/V2PSF.html
. . .
www.example1.com/VendorNPath/VNPSF.html Publisher X has decided to use the default locations specified by the content sponsor 108. Accordingly, the default location portions of the URLs of publisher X are as shown in the publisher detail box 104-1.

Publisher Y, however, has decided to use a non-default location to store the publisher side files. Publisher Y has created a directory "PubYPSF" on a particular host in which to store the publisher side files for that host. Accordingly, the non-default location portions of the URLs of publisher Y are as shown in the publisher detail box 104-2.

Publisher Y also provides the non-default location to the content management system 110, which, in turn, stores the non-default location for the publisher host in the location data 112. Publisher X may also provide data that specifies that it is using default locations to the content management system 110, and the content management system 110 will also store this information in the location data 112.

As will be described below, the content management system accesses the location data 112 to determine whether a publisher 104 utilizes a default location or a non-default location in response to a content item request for a resource served by the publisher. If a publisher does not provide information to the content management system 110 (e.g., the location data 112 does not include data for a particular publisher), then the content management system 110 determines that the publisher 104 utilizes only default locations.

If the publisher utilizes default locations, then the content management system 110 substitutes the location macro with the default location specified by the vendor 109 of the content time being served. Conversely, if the publisher utilizes non-default locations, then the content management system 110 substitutes the location macro with the non-default location specified by the publisher.

Both substitutions are illustrated in data flows for a content item request for Publisher X and Publisher Y. Request processing sequences are denoted by the numerically coded flow callouts for each publisher. With respect to Publisher X, a user device 106-1 requests a resource from the publisher, as indicated by the flow callout 1X. The resource includes a content item slot in which sponsored content is to be displayed. Instructions in the resource cause the user device 106-1 to issue a content item request to the content management system 110, as indicated by the flow callout 2X.

The content management system 110 identifies, among the content items, expandable content items CI1-CI8 eligible to fulfill the content item request. The content items are selected, for example, based on targeting criteria and other factors.

In some implementations, the content management system 110 includes a selection filter 120 that will filter eligible content items for content item requests for publishers that utilizes non-default locations. Because publisher X utilizes default locations, the selection filter 120 allows each of the candidate expandable content items to participate in a content item selection process 122, as indicted by the flow callout 3.

Assume that content item CI8 is selected by the selection process 122 to be served to the user device 106-1 in response to the request. The selection is indicated by the bold font of the tag for the content item CI8. The tag for the content item CI8 includes the default location of Vendor5, the content sponsor of the content item CI8. Because the tag for the content item CI8 does not include a location macro, the content management system 110 does not modify the tag before serving it to the user device 106-1. Thus, as indicated by the flow callout 4X, the following tag with the specified default location for Vendor5 is served to the user device 106-1
<script src="http://Ad.VN5.net/getad/param1=xx&width=728&height=90&vendorPath=Vendor5Path/V5PSF.html"></script>

However, would one of the content items that includes a location macro have been selected, e.g., content item CI1, with the macro %%Vendor1_PSF_LOC%%, then the location macro would have been replaced with the default location of Vendor1, e.g., the tag:
<script src="http://Ad.VN1.net/getad/param1=xx&width=728&height=90&vendorPath=%%Vendor1_PSF_LOC%%"></script>
would be modified to:
<script src="http://Ad.VN1.net/getad/param1=xx&width=728&height=90&vendorPath=Vendor1Path/V1PSF.html"></script>

Upon receiving the content item tag, the user device 106-1 can retrieve the required publisher side file from the host of Publisher X.

With respect to Publisher Y, a user device 106-2 requests a resource from the publisher, as indicated by the flow callout 1Y. The resource includes a content item slot in which sponsored content is to be displayed. Instructions in the resource cause the user device 106-2 to issue a content item request to the content management system 110, as indicated by the flow callout 2Y.

The content management system 110 identifies, among the content items, expandable content items CI1-CI6 eligible to fulfill the content item request. Because publisher Y utilizes non-default locations, the selection filter 120 allows only candidate expandable content items that include a location macro to participate in a content item selection process, as indicated by the flow callout 3. Here, the content item CI6 does not include a location macro, and thus it is excluded from the selection process 122. This is because if the content item CI6 were allowed to participate in the selection process and be selected, then the user device 106-2 would not be able to retrieve the publisher side file for the content sponsor 108 of the content item CI6 (i.e., Vendor 11). The exclusion of the content item CI6 is indicated by the strike-though font of CI6.

Assume that content item CI1 is selected by the selection process 122 to be served to the user device 106-2 in response to the request. The selection is indicated by the bold font of the tag for the content item CI1. The tag for the content item CI1 includes the location macro %%Vendor1_PSF_LOC%%, which corresponds to Vendor1, the content sponsor of the content item C1. Because the tag for the content item CI1 includes the location macro, the content management system 110 modifies the tag before serving it to the user device 106-2. Thus, as indicated by the flow callout 4Y, the following tag with the publisher specified non-default location of PubYPSF is served to the user device 106-2:
<script src="http://Ad.VN1.net/getad/param1=xx&width=728&height=90&vendorPath=PubYPSF/V1PSF.html"></script>

Upon receiving the content item tag, the user device 106-2 can retrieve the required publisher side file from the host of Publisher Y.

Example Process Flows

Figure 3:
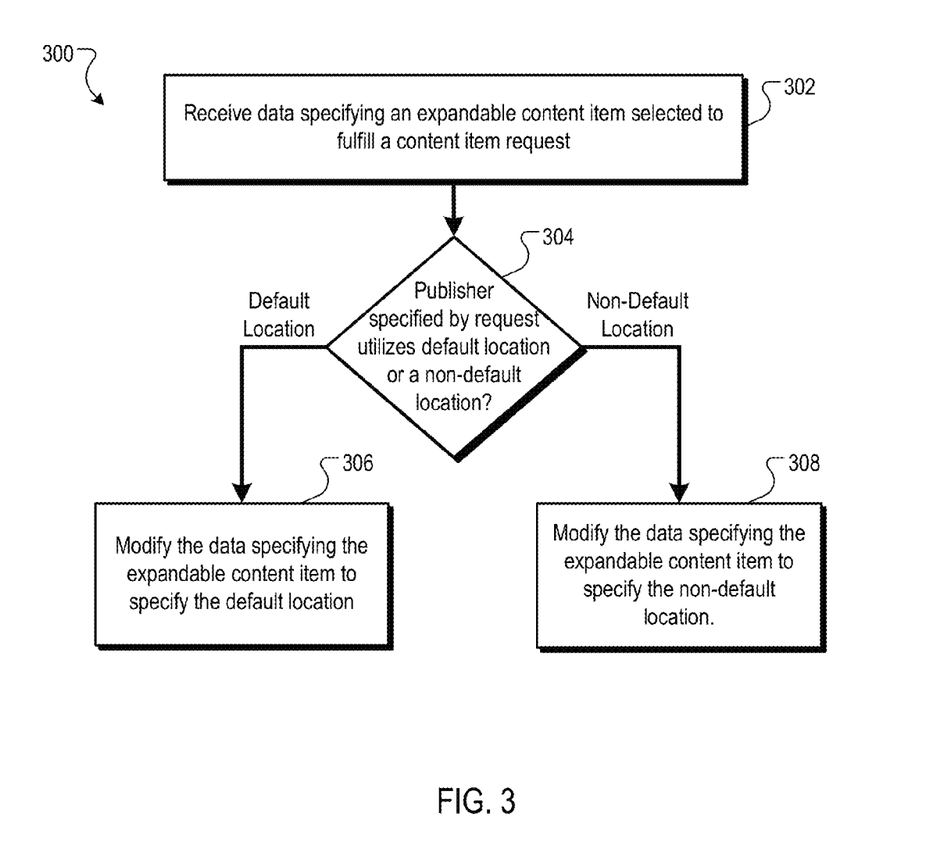
FIG. 3 is a flow diagram of an example process for modifying a content item tag with publisher location data

FIG. 3 is a flow diagram of an example process 300 for modifying a content item tag with publisher location data. The process 300 can be implemented in a data processing apparatus of the content management system 110. The process 300 modifies the content item tag of a content item determined to have been selected by a selection process, such as an advertisement that has won an advertising auction.

The content management system 110 receives data specifying an expandable content item selected to fulfill the request (302). The expandable content item that was selected also includes a location macro. For example, if the expandable content item is from Vendor3, then the location macro specifies Vendor3, e.g., %%Vendor3_PSF_LOC%%.

The content management system 110 determines whether the publisher specified by the request utilizes a default location for a publisher side file location or a non-default location for the publisher side file location (304). For example, the content item management system 110 receives a request for a particular publisher, as specified from a content item request generated by a user device 106 that render a resource served by the publisher. The request includes the host name of the host that served the resource. The host name is used to search the location data 112. If the host name is found in the location data, the content item management system 110 then determines whether the host utilizes default locations or non-default locations. In some implementations, if the host name is not found in the location data, the content item management system 110 then determines that the host utilizes only default locations.

If the content management system 110 determines that the publisher specified by the request utilizes a default location for a publisher side file location, then the content item management system 110 modifies the data specifying the expandable content item to specify the default location (306). For example, the content item manage system 110 also stores the default location data for each content item sponsor 108 in the location data 112, and uses the default location data for the vendor to substitute for the location macro.

If, on the other hand, the content management system 110 determines that the publisher specified by the request utilizes a non-default location for a publisher side file location, then content item management system 110 modifies the data specifying the expandable content item to specify the non-default location (308). For example, the content item management system 110 uses the non-default location data for the publisher to substitute for the location macro.

Figure 4:
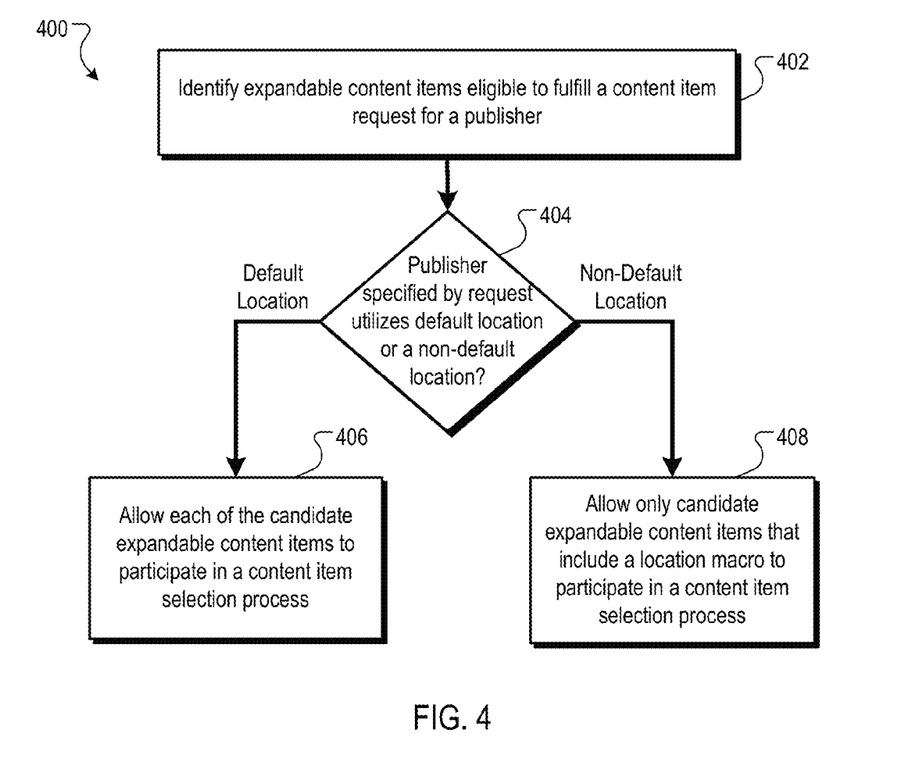
FIG. 4 is a flow diagram of an example process for filtering content items for a content item selection process based on location macros.
Figure 5:
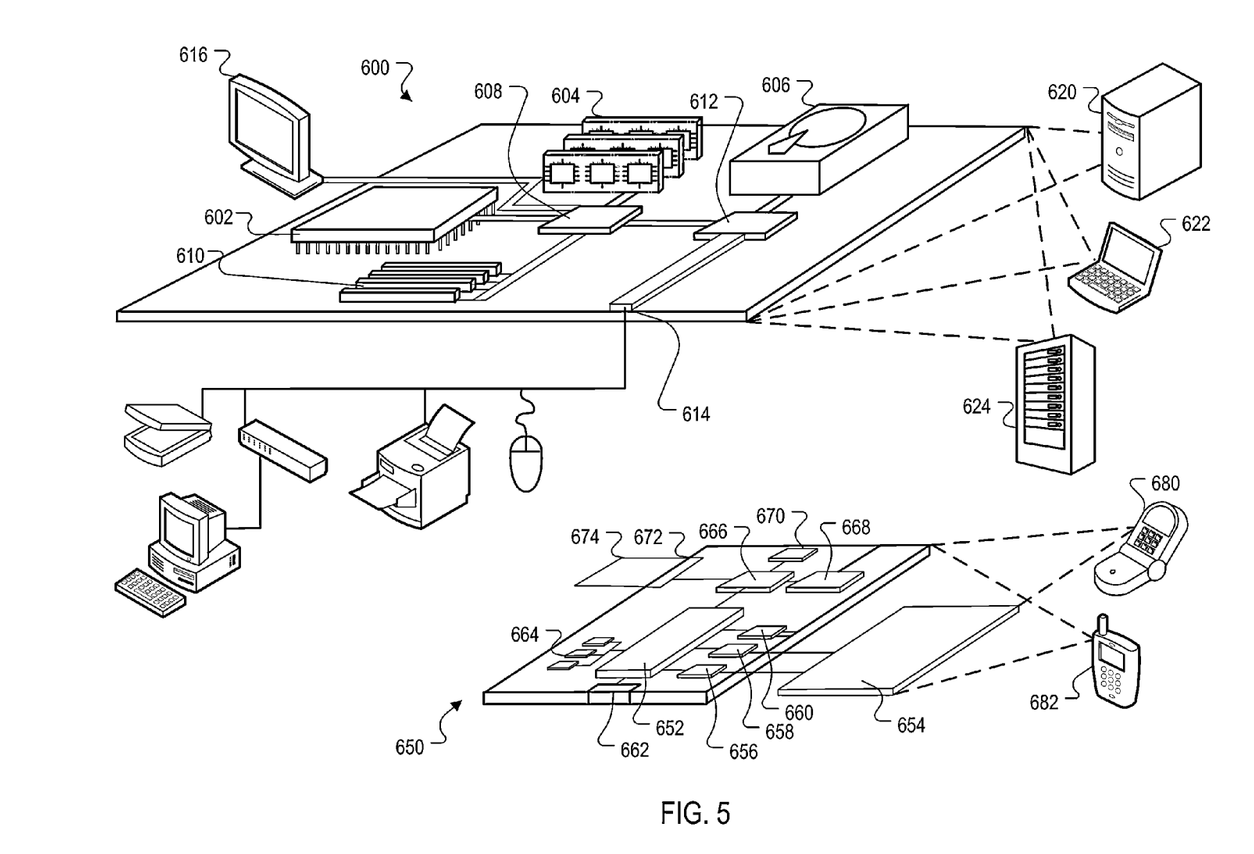
FIG. 5 is a block diagram of an example computer system that can be used to implement the methods, systems and processes described in this disclosure.

FIG. 4 is a flow diagram of an example process 400 for filtering content items for a content item selection process based on location macros. The process 400 can be implemented in a data processing apparatus of the content management system 110. The process 400 selectively filters content items from a content item selection process, depending on whether the publisher utilizes default location or non-default locations for publisher side files.

The content management system 110 identifies expandable content items eligible to fulfill a content item request for a publisher (402). For example, multiple expandable content items may satisfy targeting and bidding criteria for a content selection process.

The content item management system 110 determines whether the publisher specified by the request utilizes a default location for a publisher side file location or a non-default location for the publisher side file location (404). The process step 404 is similar to the process step 304 described above with respect to FIG. 3.

If the content management system 110 determines that the publisher specified by the request utilizes a default location for a publisher side file location, then the content item management system 110 allows each of the candidate expandable content items to participate in a content item selection process (406). For example, with respect to FIG. 1, publisher X utilizes default locations, and thus each content item is allowed to participate in the content item selection process.

If, on the other hand, the content management system 110 determines that the publisher specified by the request utilizes a non-default location for a publisher side file location, then the content item management system 110 allows only candidate expandable content items that include a location macro to participate in a content item selection process (406). For example, with respect to FIG. 1, publisher Y utilizes a non-default location, and thus the content item CI6, which did not include a location macro in its tag, is filtered from the content item selection process 122.

Additional Implementation Details

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent various typically non-mobile devices, such as televisions or other electronic devices with one or more processors embedded therein or attached thereto. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. A machine-readable medium or a computer-readable medium does not include a transitory signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, by a data processing apparatus in a content management system, expandable content item requests for publishers, each request specifying a publisher, wherein the content management system is separate from the publishers, and at least two requests each specify a different publisher, and for each request:
receiving, by the data processing apparatus, data specifying expandable content items to participate in a content item selection process to fulfill the request, the data for at least one of the expandable content item including a location macro, the location macro being a sequence of characters that is mapped to replacement sequences of characters; and
determining, by the data processing apparatus, whether the publisher specified by the request utilizes a default location for a publisher side file location or a non-default location for the publisher side file location, wherein:
the publisher side file location specifies a location of a publisher side file hosted by the publisher that facilitates processing of an expandable content item served by a vendor in a resource served by the publisher, the vendor being different from the publisher, and wherein each publisher side file for a vendor corresponds to only the expandable content items the vendor serves;
the default location is a location for the publisher side filed specified by a vendor of the expandable content item; and
the non-default location is a location for the publisher side file that is different from the default location and specified by the publisher;
for each request for which the publisher specified by the request utilizes a default location for the publisher side file location, modifying, by the data processing apparatus, the data specifying the at least one expandable content item that includes the location macro to specify the default location by substituting the location macro in the request with data specifying the default location; and
for each request for which the publisher specified by the request utilizes a non-default location for the publisher side file location, allowing only the at least one expandable content item that includes the location macro to participate in the content item selection process and modifying, by the data processing apparatus, the data specifying the at least one expandable content item to specify the non-default location by substituting the location macro in the request with data specifying the non-default location.

2. The method of claim 1, wherein the expandable content item is an expandable advertisement.

3. The method of claim 2, wherein receiving data specifying an expandable content item selected to fulfill the request comprises receiving data specifying an expandable advertisement selected by an advertisement auction.

4. A computer-implemented method, comprising:
receiving, by a data processing apparatus in a content management system, expandable content item requests for publishers, each request specifying a publisher, wherein the content management system is separate from the publishers, and at least two requests each specify a different publisher, and for each request:
identifying, by the data processing apparatus, expandable content items eligible to fulfill the content item request; and
determining, by the data processing apparatus, whether the publisher specified by the request utilizes a default location for a publisher side file location or a non-default location for the publisher side file location, wherein the publisher side file location specifies a location of a publisher side file hosted by the publisher and that facilitates processing of an expandable content item served by a vendor in a resource served by the publisher, the vendor being different from the publisher, and wherein each publisher side file for a vendor corresponds to only the expandable content items the vendor serves, and the default location for the publisher side file is a location specified by a vendor of the expandable content item, and the non-default location for the publisher side file is a location that is different from the default location and specified by the publisher;
for each request for which the publisher specified by the request utilizes a default location for the publisher side file location, allowing, by the data processing apparatus, each of the candidate expandable content items to participate in a content item selection process to select one of the candidate expandable content items to fulfill the request; and
for each request for which the publisher specified by the request utilizes a non-default location for the publisher side file location, allowing, by the data processing apparatus, only candidate expandable content items that include a location macro to participate in the content item selection process and excluding candidate expandable content items that do not include a location macro from participating in the content item selection process.

5. The method of claim 4, further comprising, for at least one request:
receiving data specifying an expandable content item selected to fulfill the request, the data including a location macro, the location macro being a sequence of characters that is mapped to replacement sequences of characters; and
determining that the publisher specified by the request utilizes a default location for the publisher side file location and in response modifying the data specifying the expandable content item to specify the default location by substituting the location macro in the request with data specifying the default location.

6. The method of claim 4, further comprising, for at least one request:
receiving data specifying an expandable content item selected to fulfill the request, the data including a location macro, the location macro being a sequence of characters that is mapped to replacement sequences of characters; and
determining that the publisher specified by the request utilizes a non-default location for the publisher side file location and in response modifying the data specifying the expandable content item to specify the non-default location specified by the publisher by substituting the location macro in the request with data specifying the non-default location.

7. The method of claim 4, wherein the expandable content item is an expandable advertisement.

8. A system, comprising:
a data processing apparatus; and
a computer memory apparatus in data communication with the data processing apparatus and storing instructions executable by the data processing apparatus and that upon such execution cause the data processing apparatus to perform operations comprising:
receiving an expandable content item requests for publishers, each request specifying a publisher, wherein the data processing apparatus is separate from the publishers, and at least two requests each specify a different publisher, and for each request:
receiving data specifying expandable content items to participate in a content item selection process to fulfill the request, the data for at least one of the expandable content item including a location macro, the location macro being a sequence of characters that is mapped to replacement sequences of characters;
determining whether the publisher specified by the request utilizes a default location for a publisher side file location or a non-default location for the publisher side file location, wherein:
the publisher side file location specifies a location of a publisher side file hosted by the publisher that facilitates processing of an expandable content item served by a vendor in a resource served by the publisher, the vendor being different from the publisher, and wherein each publisher side file for a vendor corresponds to only the expandable content items the vendor serves;
the default location is a location for the publisher side filed specified by a vendor of the expandable content item; and
the non-default location is a location for the publisher side file that is different from the default location and specified by the publisher;
for each request for which the publisher specified by the request utilizes a default location for the publisher side file location, modifying the data specifying the at least one expandable content item that includes the location macro to specify the default location by substituting the location macro in the request with data specifying the default location; and
for each request for which the publisher specified by the request utilizes a non-default location for the publisher side file location, allowing only the at least one expandable content item that includes the location macro to participate in the content item selection process and modifying the data specifying the at least one expandable content item to specify the non-default location by substituting the location macro in the request with data specifying the non-default location.

9. The system of claim 8, wherein the expandable content item is an expandable advertisement.

10. The system of claim 9, wherein receiving data specifying an expandable content item selected to fulfill the request comprises receiving data specifying an expandable advertisement selected by an advertisement auction.

11. A system, comprising:
a data processing apparatus; and
a computer memory apparatus in data communication with the data processing apparatus and storing instructions executable by the data processing apparatus and that upon such execution cause the data processing apparatus to perform operations comprising:
receiving expandable content item requests for publishers, each request specifying a publisher, wherein the data processing apparatus is separate from the publishers, and at least two requests each specify a different publisher, and for each request:
identifying expandable content items eligible to fulfill the content item request; and
determining whether the publisher specified by the request utilizes a default location for a publisher side file location or a non-default location for the publisher side file location, wherein the publisher side file location specifies a location of a publisher side file hosted by the publisher and that facilitates processing of an expandable content item served by a vendor in a resource served by the publisher, the vendor being different from the publisher, and wherein each publisher side file for a vendor corresponds to only the expandable content items the vendor serves, and the default location for the publisher side file is a location specified by a vendor of the expandable content item, and the non-default location for the publisher side file is a location that is different from the default location and specified by the publisher;
for each request for which the publisher specified by the request utilizes a default location for the publisher side file location, allowing each of the candidate expandable content items to participate in a content item selection process to select one of the candidate expandable content items to fulfill the request; and
for each request for which the publisher specified by the request utilizes a non-default location for the publisher side file location, allowing only candidate expandable content items that include a location macro to participate in the content item selection process and excluding candidate expandable content items that do not include a location macro from participating in the content item selection process.

12. The system of claim 11, the operations further comprising, for at least one request:
- receiving data specifying an expandable content item selected to fulfill the request, the data including a location macro, the location macro being a sequence of characters that is mapped to replacement sequences of characters; and
- determining that the publisher specified by the request utilizes a default location for the publisher side file location and in response modifying the data specifying the expandable content item to specify the default location by substituting the location macro in the request with data specifying the default location.

13. The system of claim 11, the operations further comprising, for at least one request:
- receiving data specifying an expandable content item selected to fulfill the request, the data including a location macro, the location macro being a sequence of characters that is mapped to replacement sequences of characters; and
- determining that the publisher specified by the request utilizes a non-default location for the publisher side file location and in response modifying the data specifying the expandable content item to specify the non-default location specified by the publisher by substituting the location macro in the request with data specifying the non-default location.

14. The system of claim 11, wherein the expandable content item is an expandable advertisement.

15. A non-transitory computer memory storing instructions executable by a data processing apparatus and that upon such execution cause the data processing apparatus to perform operations comprising:
- receiving an expandable content item requests for publishers, each request specifying a publisher, wherein the data processing apparatus is separate from the publishers, and at least two requests each specify a different publisher, and for each request:
  - receiving data specifying expandable content items to participate in a content item selection process to fulfill the request, the data for at least one of the expandable content item including a location macro, the location macro being a sequence of characters that is mapped to replacement sequences of characters; and
  - determining whether the publisher specified by the request utilizes a default location for a publisher side file location or a non-default location for the publisher side file location, wherein:
    - the publisher side file location specifies a location of a publisher side file hosted by the publisher that facilitates processing of an expandable content item served by a vendor in a resource served by the publisher, the vendor being different from the publisher, and wherein each publisher side file for a vendor corresponds to only the expandable content items the vendor serves;
    - the default location is a location for the publisher side filed specified by a vendor of the expandable content item; and
    - the non-default location is a location for the publisher side file that is different from the default location and specified by the publisher;
- for each request for which the publisher specified by the request utilizes a default location for the publisher side file location, modifying the data specifying the at least one expandable content item that includes the location macro to specify the default location by substituting the location macro in the request with data specifying the default location; and
- for each request for which the publisher specified by the request utilizes a non-default location for the publisher side file location, allowing only the at least one expandable content item that includes the location macro to participate in the content item selection process and modifying the data specifying the at least one expandable content item to specify the non-default location by substituting the location macro in the request with data specifying the non-default location.

16. The non-transitory computer memory of claim 15, wherein the expandable content item is an expandable advertisement.

17. The non-transitory computer memory of claim 16, wherein receiving data specifying an expandable content item selected to fulfill the request comprises receiving data specifying an expandable advertisement selected by an advertisement auction.

18. A non-transitory computer memory storing instructions executable by a data processing apparatus and that upon such execution cause the data processing apparatus to perform operations comprising:
- receiving expandable content item requests for publishers, each request specifying a publisher, wherein the data processing apparatus is separate from the publishers, and at least two requests each specify a different publisher, and for each request:
  - identifying expandable content items eligible to fulfill the content item request; and
  - determining whether the publisher specified by the request utilizes a default location for a publisher side file location or a non-default location for the publisher side file location, wherein the publisher side file location specifies a location of a publisher side file hosted by the publisher and that facilitates processing of an expandable content item served by a vendor in a resource served by the publisher, the vendor being different from the publisher, and wherein each publisher side file for a vendor corresponds to only the expandable content items the vendor serves, and the default location for the publisher side file is a location specified by a vendor of the expandable content item, and the non-default location for the publisher side file is a location that is different from the default location and specified by the publisher;
- for each request for which the publisher specified by the request utilizes a default location for the publisher side file location, allowing each of the candidate expandable content items to participate in a content item selection process to select one of the candidate expandable content items to fulfill the request; and
- for each request for which the publisher specified by the request utilizes a non-default location for the publisher side file location, allowing only candidate expandable content items that include a location macro to participate in the content item selection process and excluding candidate expandable content items that do not include a location macro from participating in the content item selection process.

19. The non-transitory computer memory of claim 18, the operations further comprising, for at least one request:
- receiving data specifying an expandable content item selected to fulfill the request, the data including a location macro, the location macro being a sequence of characters that is mapped to replacement sequences of characters; and determining that the publisher specified by the request utilizes a default location for the publisher side file location and in response modifying the data specifying the expandable content item to specify the default location by substituting the location macro in the request with data specifying the default location.

20. The non-transitory computer memory of claim 18, the operations further comprising, for at least one request:

receiving data specifying an expandable content item selected to fulfill the request, the data including a location macro, the location macro being a sequence of characters that is mapped to replacement sequences of characters; and determining that the publisher specified by the request utilizes a non-default location for the publisher side file location and in response modifying the data specifying the expandable content item to specify the non-default location specified by the publisher by substituting the location macro in the request with data specifying the non-default location.

21. The non-transitory computer memory of claim 18, wherein the expandable content item is an expandable advertisement.

* * * * *